United States Patent
Zucker (10) Patent No.: US 9,755,468 B2
(45) Date of Patent: Sep. 5, 2017

(54) ELECTRIC MOTOR/GENERATOR WITH MULTIPLE INDIVIDUALLY CONTROLLED TURN-LESS STRUCTURES

(71) Applicant: Oved Zucker, Solana Beach, CA (US)

(72) Inventor: Oved Zucker, Solana Beach, CA (US)

(*) Notice: Subject to any disclaimer, the term of this patent is extended or adjusted under 35 U.S.C. 154(b) by 0 days.

(21) Appl. No.: 15/047,280

(22) Filed: Feb. 18, 2016

(65) Prior Publication Data
US 2016/0181879 A1    Jun. 23, 2016

Related U.S. Application Data (63) Continuation-in-part of application No. 13/844,347, filed on Mar. 15, 2013, now abandoned.
(Continued)

(51) Int. Cl.
*H02K 3/04*    (2006.01)
*H02K 11/20*   (2016.01)
(Continued)

(52) U.S. Cl.
CPC ............... *H02K 3/04* (2013.01); *H02K 7/14* (2013.01); *H02K 11/0094* (2013.01); *H02K 11/20* (2016.01); *H02K 11/33* (2016.01); *H02K 41/031* (2013.01); *H02P 9/00* (2013.01); *H02P 25/18* (2013.01); *H02P 25/22* (2013.01); *H02K 2213/12* (2013.01); *H02P 2101/45* (2015.01); *Y10T 29/49009* (2015.01)

(58) Field of Classification Search
CPC .. H02K 3/04; H02K 3/26; H02K 3/28; H02K 11/00; H02K 11/001; H02K 11/0015; H02K 11/0057; H02K 11/0068; H02K 11/0073; H02K 3/12; H02K 23/66; H02K 41/031; H02K 41/03; H02K 11/30; H02K 11/33; H02K 11/35; H02K 11/38; H02K 11/40; H02P 6/006; H02P 25/06
USPC ....... 310/194, 195, 196, 197, 198, 199, 200, 310/201, 202, 203, 208, 254.1, 68 D, 310/68 A, 12.21, 12.22, 12.19, 12.18, 179
See application file for complete search history.

(56) References Cited

U.S. PATENT DOCUMENTS 8,872,449 B2 * 10/2014 Tojo ................ H02K 41/03
                                                    318/135
2004/0202797 A1 * 10/2004 Ginder ............ H01F 41/16
                                                    427/598
(Continued)

FOREIGN PATENT DOCUMENTS

JP    WO 2011024624 A1 *  3/2011  ........... H02K 41/03

*Primary Examiner* — Michael Andrews
*Assistant Examiner* — Robert E Mates
(74) *Attorney, Agent, or Firm* — Jacquez Land Greenhaus LLP; Bruce W. Greenhaus, Esq.

(57) ABSTRACT

Systems and methods for generating currents in a plurality of CTS that may be independently controlled by a microprocessor. In some cases, a DC power source (such as a battery) is connected to each inverter. In other cases, a rechargeable DC power source (such as a capacitor) is connected to each inverter. Multiple controllable, turn-less structures may be provided in a suitable configuration with a single, main control processor or alternatively, with both a main control processor and several intermediate level command modules, each intermediate level command module coupled to a respective one of the inverters to control currents through each conductor of the respective inverter.

16 Claims, 9 Drawing Sheets

Related U.S. Application Data (60) Provisional application No. 61/651,071, filed on May 24, 2012.

(51) Int. Cl.
*H02K 11/00* (2016.01)
*H02K 11/33* (2016.01)
*H02P 25/22* (2006.01)
*H02K 41/03* (2006.01)
*H02K 7/14* (2006.01)
*H02P 9/00* (2006.01)
*H02P 25/18* (2006.01)
*H02P 101/45* (2016.01)

(56) References Cited

U.S. PATENT DOCUMENTS

| | | | | |
|---|---|---|---|---|
| 2004/0239911 A1* | 12/2004 | Carter | ............... | G03F 7/70066 355/75 |
| 2004/0255767 A1* | 12/2004 | Frasca | ............... | F41B 6/00 89/8 |
| 2006/0162536 A1* | 7/2006 | Frasca | ............... | F41B 6/00 89/8 |
| 2007/0262740 A1* | 11/2007 | Podack | ............... | B62D 5/0484 318/587 |
| 2009/0184681 A1* | 7/2009 | Kuno | ............... | B60K 6/365 320/128 |
| 2011/0062901 A1* | 3/2011 | Busch | ............... | H02K 11/215 318/135 |
| 2011/0074328 A1* | 3/2011 | Zhao | ............... | H02H 7/0838 318/490 |

* cited by examiner

ELECTRIC MOTOR/GENERATOR WITH MULTIPLE INDIVIDUALLY CONTROLLED TURN-LESS STRUCTURES

CROSS-REFERENCE TO RELATED APPLICATION

The current application claims priority under 35 U.S.C. §119(e) to U.S. Provisional Patent Application Ser. No. 61/651,071, filed on May 24, 2012 and entitled "Electric Motor/Generator with Individually Driven Multiple Poles," which is incorporated by reference herein in its entirety and to U.S. patent application Ser. No. 13/844,347, filed on Mar. 15, 2013 and entitled "Electric Motor/Generator with Multiple Individually Controlled Turn-less Structures", which is incorporated by reference herein in its entirety.

TECHNICAL FIELD

The disclosed method and apparatus relates to electric motors and generators, and more specifically to motors and generators that have a plurality of turn-less windings.

BACKGROUND

The field of motor and generator design comprises synchronous and induction motors and generators. In such motors and generators, a rotating, or more generally speaking a traveling, magnetic field is generated with the aid of inverters. The inverters have switches, such as IGBT's (insulated-gate bipolar transistors) or MOSFETs (metal-oxide-semiconductor field-effect transistors) that control currents through wires that are wound around a magnetic core. In some cases, the MOSFETs are controlled by a microprocessor that generates the appropriate currents at an appropriate frequency in each of the windings. In some such cases, the MOSFETs use pulse width modulation (PWM) signals to control the current through the MOSFETs, and so through the associated windings.

Windings (typically in the stator) are a necessary component of current induction motors and generators. In motors the windings are excited with electrical current to generate a magnetic field that interacts with a magnetic field associated with a rotor. The interaction of the magnetic field generated in the stator with the magnetic field in the rotor causes the rotor to move with respect to the stator. In a generator relative motion of a rotor with respect to a stator causes electrical current to be generated within the windings of the stator as a consequence of the motion of the magnetic field of the rotor with respect to the stationary windings on the stator.

There are several limitations and costs to having windings in a motor or generator. These are well known to those skilled in the art and are not enumerated here for the sake of brevity. In light of these limitations, it would be desirable to provide an induction motor or generator in which a controllable electro-magnetic field can be generated in the rotor without the need for windings.

In addition, having a motor or generator in which the rotor and stator are in very close proximity provides a more efficient motor or generator. In current motors and generators, mechanical bearings are used to maintain a magnetic flux air gap between the moving rotor and the stationary stator. The higher the quality of the bearings, the more efficient the motor or generator. However, high quality bearings are expensive and over time, can fail due to wear that occurs as a result of the relative motion of the rotor and stator.

Accordingly, there is presently a desire for a motor/generator design that does not require windings wound around a core and that has a very small magnetic flux air gap between the stator and rotor with less reliance on bearings to maintain the gap.

SUMMARY

In some embodiments of the disclosed method and apparatus, several controllable turnless structures (CTSs) are provided. Each CTS includes a turnless, three-phase winding (TTW) and an inverter. In some cases, the TTW includes three conductors connected at one end. The connected conductors form a three phase, Y-network configuration. Currents in each CTS may be independently controlled by a microprocessor. In some cases, a DC power source (such as a battery) is connected to each inverter. In other cases, a rechargeable DC power source (such as a capacitor) is connected to each inverter. Multiple controllable, turn-less structures may be provided in a suitable configuration with a single, main control processor or alternatively, with both a main control processor and several intermediate level command modules, each intermediate level command module coupled to a respective one of the inverters to control currents through each conductor of the respective inverter. Furthermore, in some embodiments, the microcontroller establishes currents in the turnless structures that generate a magnetic bearing. Still further, sensors may be used to determine whether a CTS has failed and to disable the CTS. Additionally, the load can be sensed to allow either the main control processor or each of the intermediate level command modules to deactivate selected CTSs to reduce the resources when less than all of the resources are required.

BRIEF DESCRIPTION OF THE DRAWINGS

The disclosed method and apparatus, in accordance with one or more various embodiments, is described with reference to the following figures. The drawings are provided to merely depict examples of some embodiments of the disclosed method and apparatus and thus facilitate the reader's understanding of the disclosed method and apparatus. They should not be considered to limit the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

Figure 1:
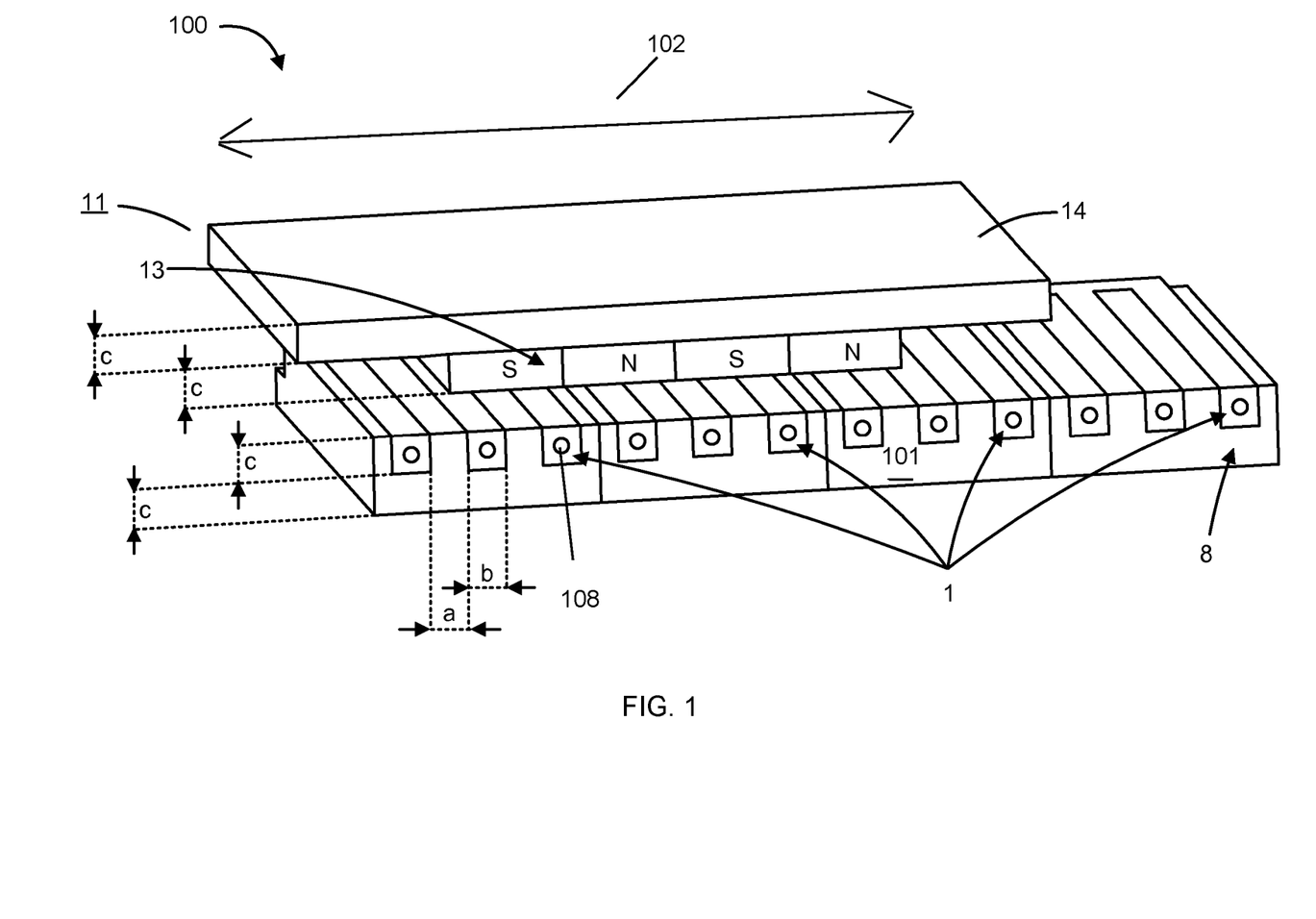
FIG. 1 is an illustration of a portion of some embodiments of a motor/generator in accordance with the presently disclosed method and apparatus.

FIG. 1 is an illustration of a portion of some embodiments of a motor/generator 100 in accordance with the presently disclosed method and apparatus. FIG. 1 shows a linear configuration of a motor/generator having a stator 8. The stator 8 has four controllable turnless structures (CTSs) 6. The motor/generator also has a rotor 11 associated with the stator 8. Each CTS 6 is independently controlled. While a linear configuration of CTSs 6 is shown in FIG. 1, other configurations, including rotating motors and generators are within the scope of the disclosed method and apparatus. The configuration of FIG. 1 can be used to generate linear motion of the rotor 11 with respect to the stator 8 along a longitudinal axis 102. Alternatively, this configuration can be used to generate current in response to linear motion of the rotor 11 with respect to the stator 8.

It should be noted that the term rotor is commonly used in the context of a motor/generator in which an armature rotates rather than one in which the relative motion of the armature with respect to the stator is linear. However, for the purposes of this discussion, the term rotor will be used more generally to apply to any armature (shuttle armature, rotor armature or other) having a magnetic field and which moves with respect to a stator, without regard to the shape of the path of the motion. Those of ordinary skill in the art will understand that a motor in accordance with the disclosed method and apparatus can be configured such that the rotor rotates. More generally, the motor can be configured to move the rotor along a path that can have any shape in response to the interaction of the magnetic field of the rotor with respect to the magnetic field generated in the stator. Likewise, a generator in accordance with the disclosed method and apparatus can be configured to generate current in the rotor in response to relative motion of the rotor along a path of any shape, so long as the magnetic field of the rotor is imposed on the stator in a manner that will induce a current in the conductors of the stator, as will be discussed in more detail below.

The rotor 11 has a magnetic field that is provided by a set of permanent magnets 13. In some cases, the magnets are neodymium-iron-boron (NdFeB) embedded in a ferromagnetic substrate 14. However, other materials can be used for both the magnets 13 and the substrate 14. The magnets 13 are configured as dipoles having a south pole (S) and a north pole (N). Several dipoles are placed adjacent to one another over the length of the rotor 11. The spacing of the magnets 13 in one case is approximately equal to the magnetic dimension. In some cases, a "Halbach array" of small magnets can also be used. In a Halbach array, the magnetic field on one side of the array is augmented while the field on the other side of the array is diminished. The stator 8 has at least one CTS 6, but typically will comprise several CTSs 6.

Figure 2:
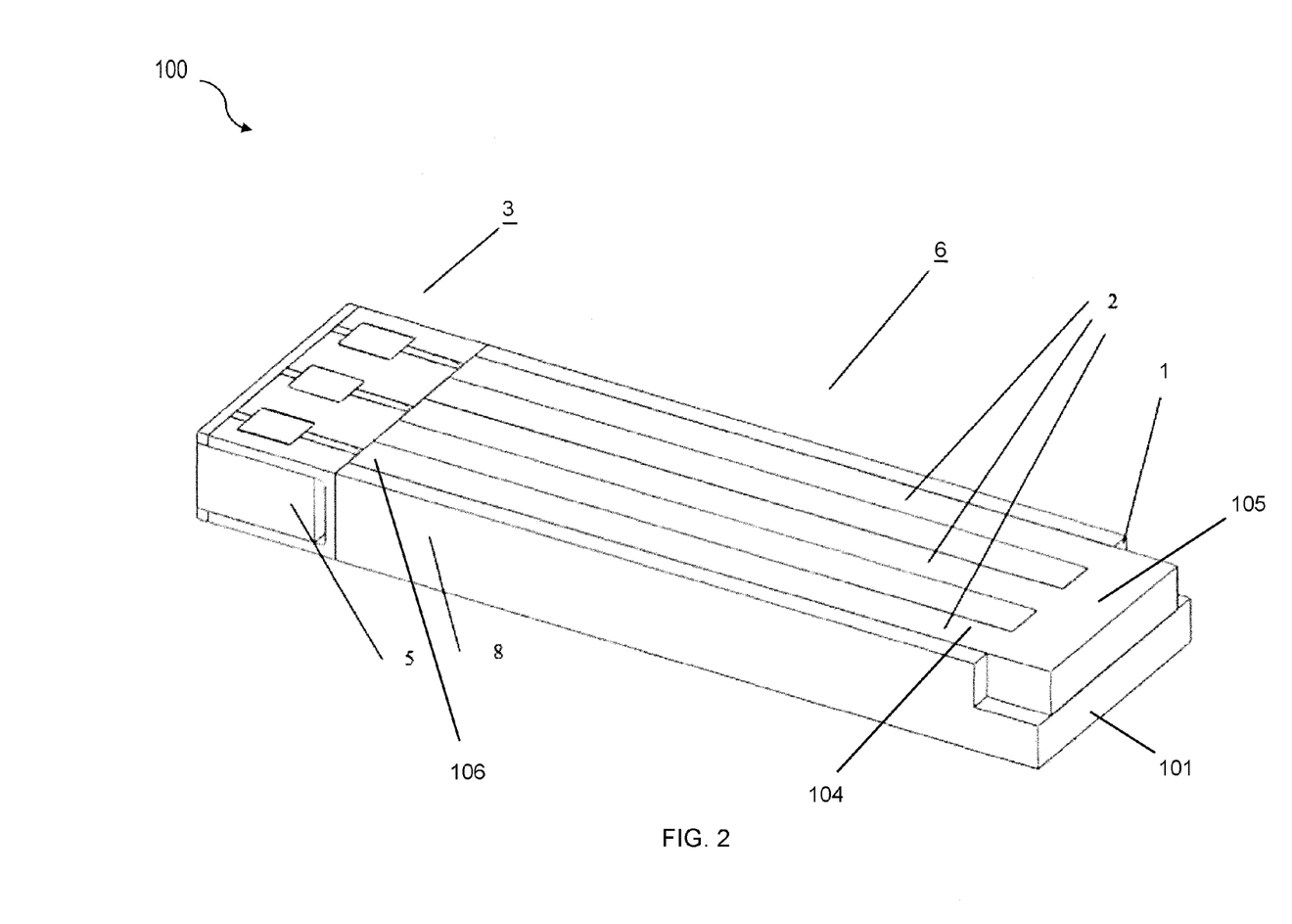
FIG. 2 is an illustration of a controllable turnless structure (CTS) in accordance with some embodiments of the disclosed method and apparatus.

FIG. 2 is an illustration of a CTS 6 in accordance with some embodiments of the disclosed method and apparatus. Each CTS 6 (only one is shown in FIG. 2) has a turnless three-phase winding (TTW) 1 and an inverter 3. In some cases, the CTS 6 includes a substrate 101 that supports the TTW 1. In the case shown, the TTW 1 includes three conductors 2 and a cross member 105. The three conductors 2 each have a proximal end 104 and a distal end 106. The proximal end 104 of the conductors 2 are coupled together by the conductive cross member 105. The distal end 106 of each conductor 2 is coupled to a respective one of three contacts 9 (shown in FIG. 4) of the inverter 3.

Figure 3:
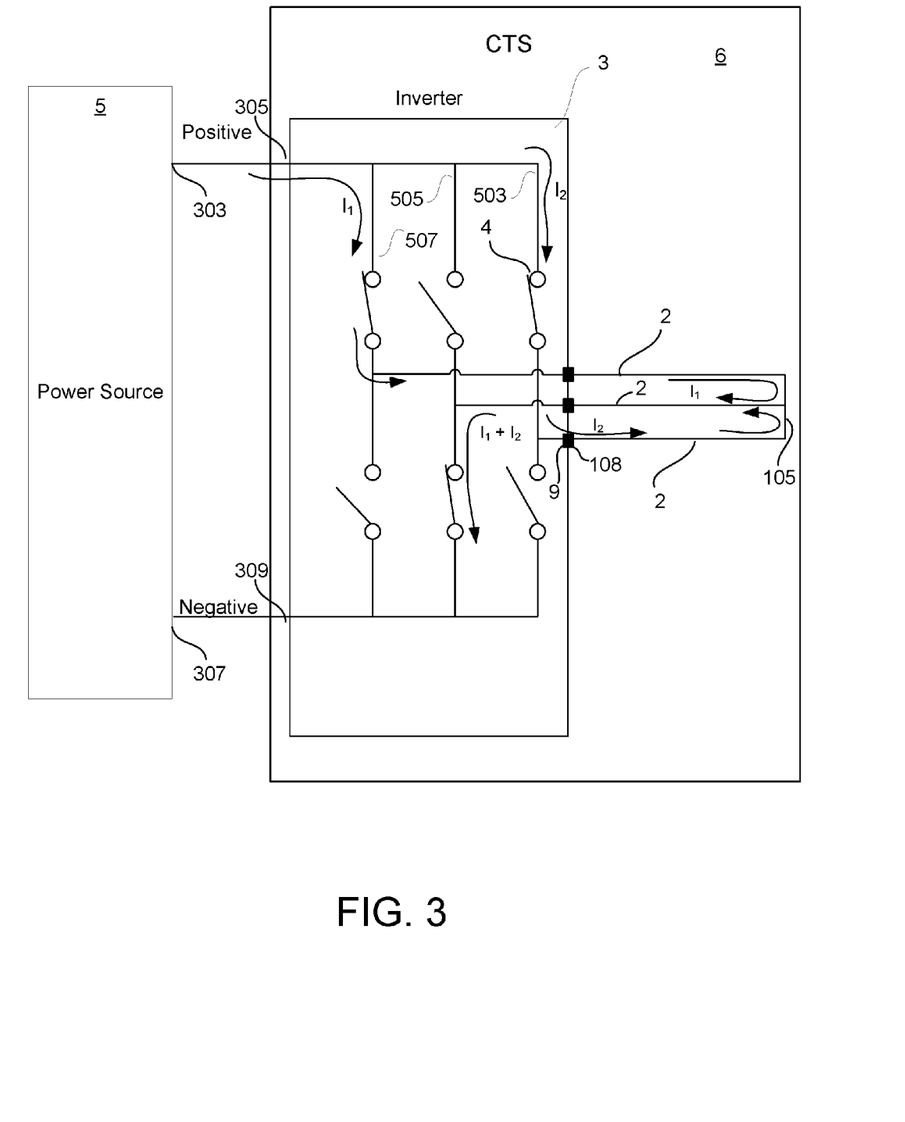
FIG. 3 is an electrical schematic of a CTS.

FIG. 3 is an electrical schematic of a CTS 6. A power source 5 is coupled to the inverter 3. In the case of a motor, the power source 5 is typically a battery. In the case of a generator, the power source 5 is typically a capacitor. However, a battery may be connected to a generator in order to recharge the battery. Similarly, a capacitor may be used to provide current to a motor. These functions can be implemented intermittently, such that forces applied to the rotor 11 allow currents to be generated in the conductors 2 for a time, after which current is provided from the power source 5 to drive the rotor 11.

The inverter 3 may be configured as an H-bridge inverter. A positive contact 303 of the power source 5 is coupled to a positive input 305 to the inverter 3. Similarly, a negative contact 307 of the power source 5 is coupled to a negative input 309 to the inverter 3. In a three-phase inverter, six switches 4 control the connections between the inverter 3 and the conductors 2 (i.e., whether the proximal end of the conductor is coupled to the positive contact 303 of the power source 5 or to the negative contact 307 of the power source 5. In a motor, controlling the switches 4 provides control over the direction of the currents that will flow through each of the three conductors 2 of the CTS 6. Each of the six switches 4 of the inverter 3 is controlled by a control circuit (not shown in FIG. 3), as will be discussed in greater detail below. In a motor, magnetic fields are generated by controlling the direction and magnitude of the currents through each conductor 2. In a generator, the switches ensure that currents generated in the conductors 2 are applied to the appropriate terminal of the power source 5 to properly charge the power source 5.

Figure 4:
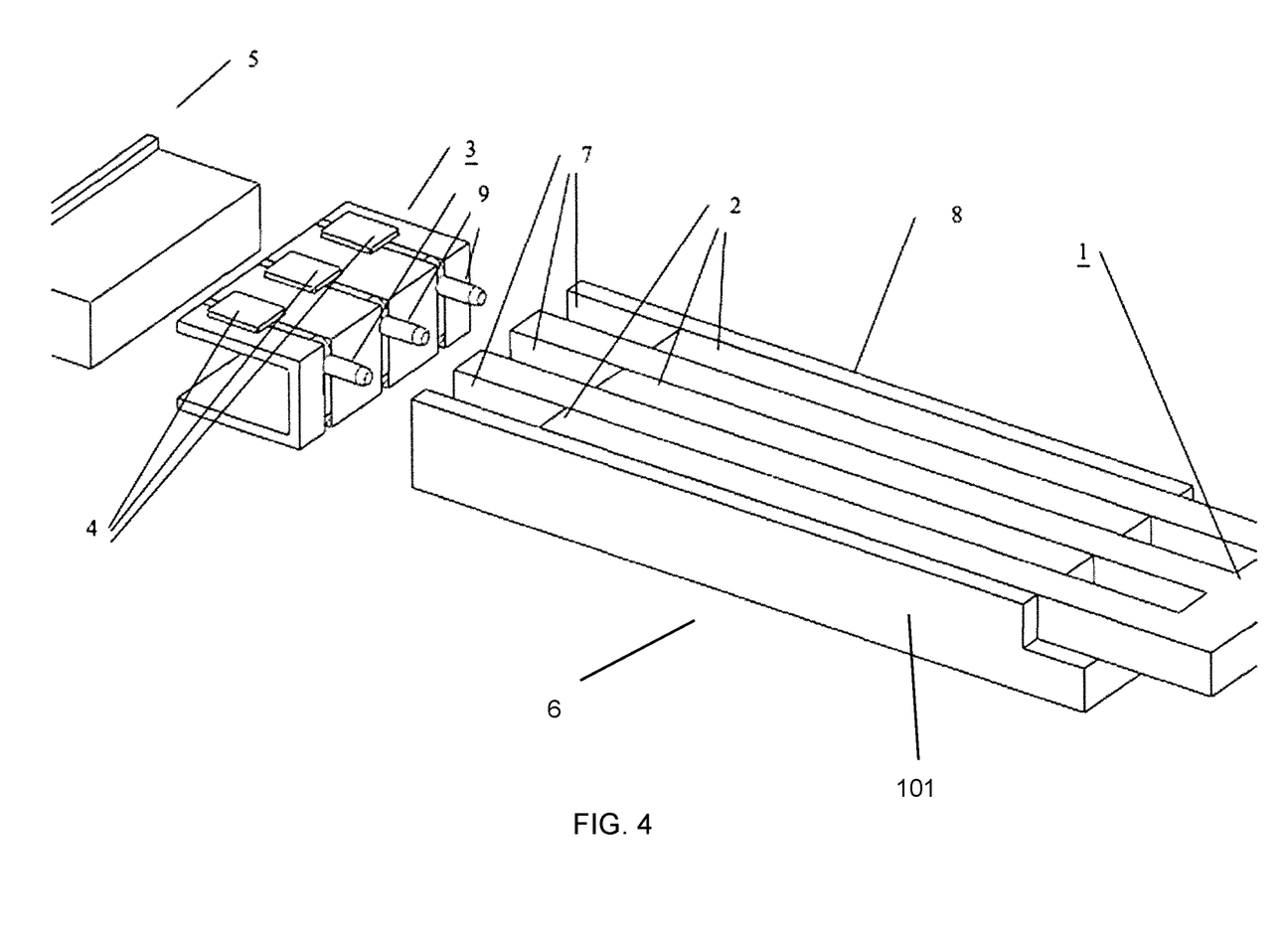
FIG. 4 is a more detailed illustration of the components of a CTS, including a TTW, a substrate and an inverter of the CTS.

FIG. 4 is a more detailed illustration of the components of a CTS 6, including a TTW 1, a substrate 101 and an inverter 3 of the CTS 6. In addition, the power source 5 is shown. In some cases, the TTW 1 can be deposited on the substrate 101. Conductor slots 7 may be formed in the substrate 101. The TTW 1 may be formed using MEMS (microelectromechanical systems) technology. In some such cases, the slots 7 are etched and the conductors 2 and conductive cross member 105 are deposited within the etched slots 7. In some cases, the substrate 101 is made from a ferromagnetic material, in which case, insulating material can be deposited in the slots prior to deposition of the conductors 2. In some cases, the conductors 2 can be fabricated by copper electroplating to fill the insulated slots 7. Non-ferromagnetic material may be used in some cases as the substrate 101 to prevent the substrate from being saturated by the magnetic field generated by the currents that flow through the conductors 2. Using MEMS technology allows small pole sizes to be fabricated (i.e., millimeter or submillimeter poles). By creating TTWs with small pole sizes, there is an increase in the ratio of surface area to volume, resulting in better cooling. As will be discussed below, cooling can also be assisted by providing cooling channels in the inverter 3.

In some cases, the cross-section of the conductors 2 and the cross member 105 have the same dimensions. The cross-sections may be essentially square (substantially equal in width and height). There are three dimensions a, b and c are of interest in the configuration of the CTS 6 (see FIG. 1): (1) the distance a between the conductors 2; (2) the width b of the conductors 2; and (3) the height c of the conductors 2. The conductors 2 and cross-members 105 may be made flush with the surface of the substrate 101. In one case, the depth of the substrate 101 is two times c. In some cases, a is equal to b. The size of the conductors 2, and thus the pole size of the motor or generator, is sufficiently small to allow for large numbers of poles to be distributed over the length of the motor/generator (or along the perimeter of the stator 8 of a rotary motor/generator). This in turn allow a high power density while maintaining a high surface to volume ratio. One result is efficient and effective cooling of the CTS 6. It should be noted that the small size of the CTSs 6 also make it possible to fabricate CTSs 6 as planar structures, at least in an initial stage of fabrication. This facilitates producing the conductor slots 7 with MEMS technology. This is possible even when putting CTSs 6 together to fabricate a rotary motor/generator. For example, if the CTSs 6 are to be used in a drum-shaped device, the stator is initially designed as a multifaceted regular polygon. The number of facets is equal to the number of poles and divisible by 6. In addition, a substantially smooth cylindrical bore can be attained by having the relative difference between the corner radius and the inside radius of a facet be less than about 0.01%, where from geometry of regular polygons, the number of poles is not less than 222 with a corresponding stator thickness to radius ratio of less than 2.8%.

As shown in FIG. 1, the dimensions of the rotor 11 are related to the dimensions a, b, and c of the stator 8. In some cases, the width of the dipole is equal to 3 times the sum of a and b. Accordingly, for a three-phase motor/generator, the width of the dipole will be equal to the width of a CTS 6. It should be noted that the distance between conductors 2 of two adjacent CTSs 6 is equal to a. The magnets 13 have a thickness equal to c. In addition, for a rotor 11 having the magnets 13 mounted on ferromagnetic substrate 14, the ferromagnetic substrate 14 has a thickness equal to c. The gap height maintained between the stator 8 and the moving rotor 11, however, needs to be smaller than or equal to the magnitude of c to prevent a loss of flux density in the gap. For this case, the gap height, as well as, the dimensions a and b and the height of the magnet 13 and substrate 14 are all set equal to c, which is herein referred to as the pole size of the device. Therefore, the total height the motor system is five time c and the total width of a CTS forming a magnetic dipole is six times c (i.e., twice the sum of a and b, where a=b=c).

As the pole size shrinks, so does the volume per unit area. Thus, since the total force is proportional only to the area, the resulting power density increases with smaller pole size, while the losses increase due to a smaller conductor cross section. Smaller pole sizes also result in increases in the surface to volume ratio, which allows for better cooling. If a, b, and c are equal in size, the overall system volume is determined by the pole size. Accordingly, reducing the pole size results in a smaller overall system volume, and thus, a larger power density. However, as noted above, a reduction of the pole size yields a smaller conductor volume, which increases the resistivity, leading to higher resistive losses in the system. Therefore, there is a trade-off between the weight and volume of the system and the overall efficiency.

Figure 5:
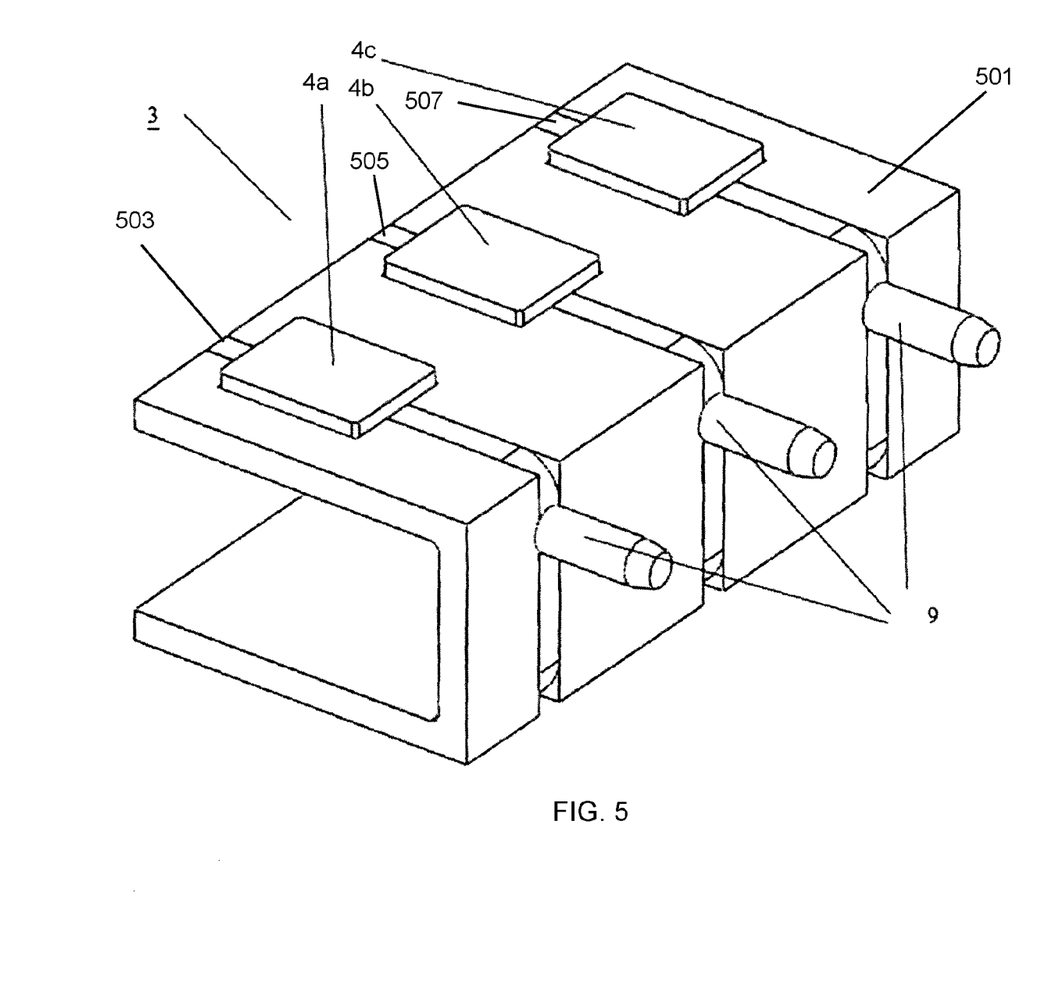
FIGS. 5, 6 and 7 are detailed illustrations of the inverter.
Figure 6:
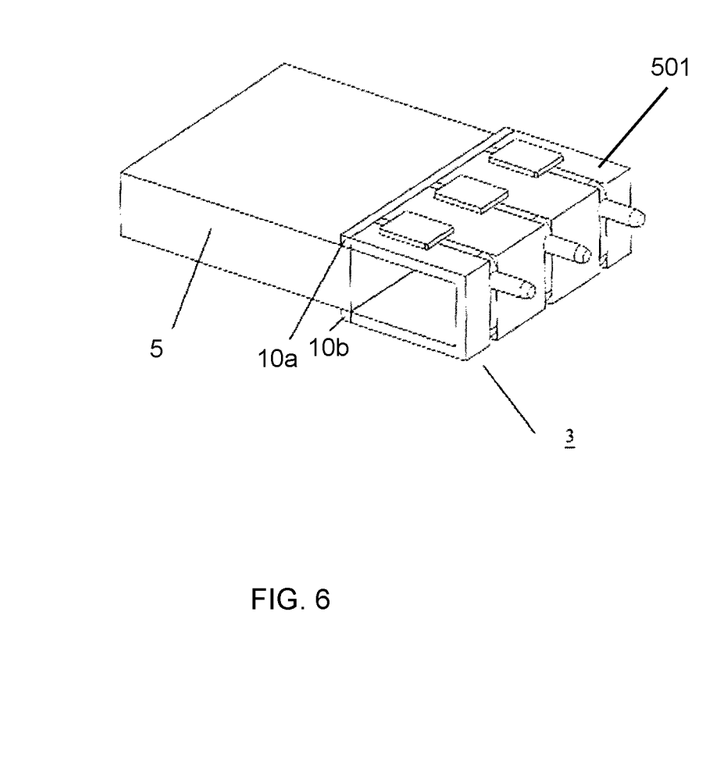
Figure 7:
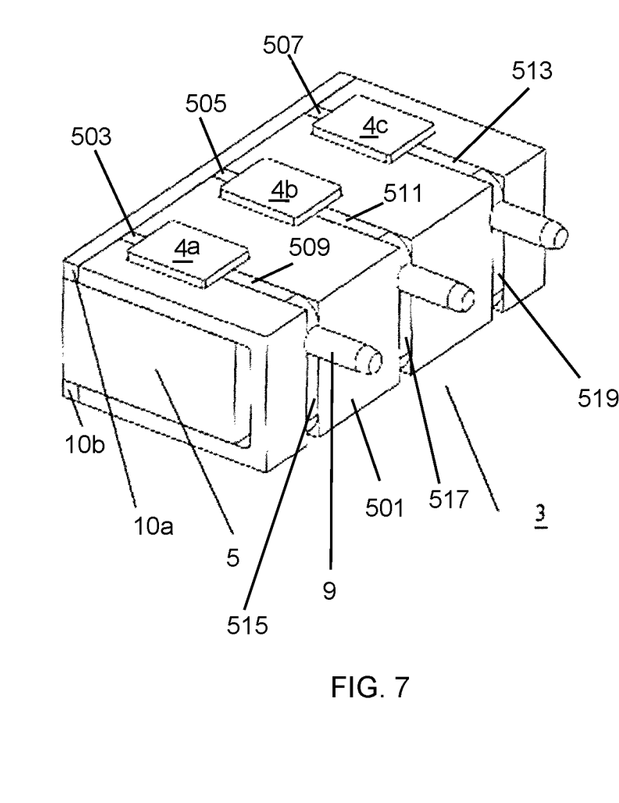
Figure 8:
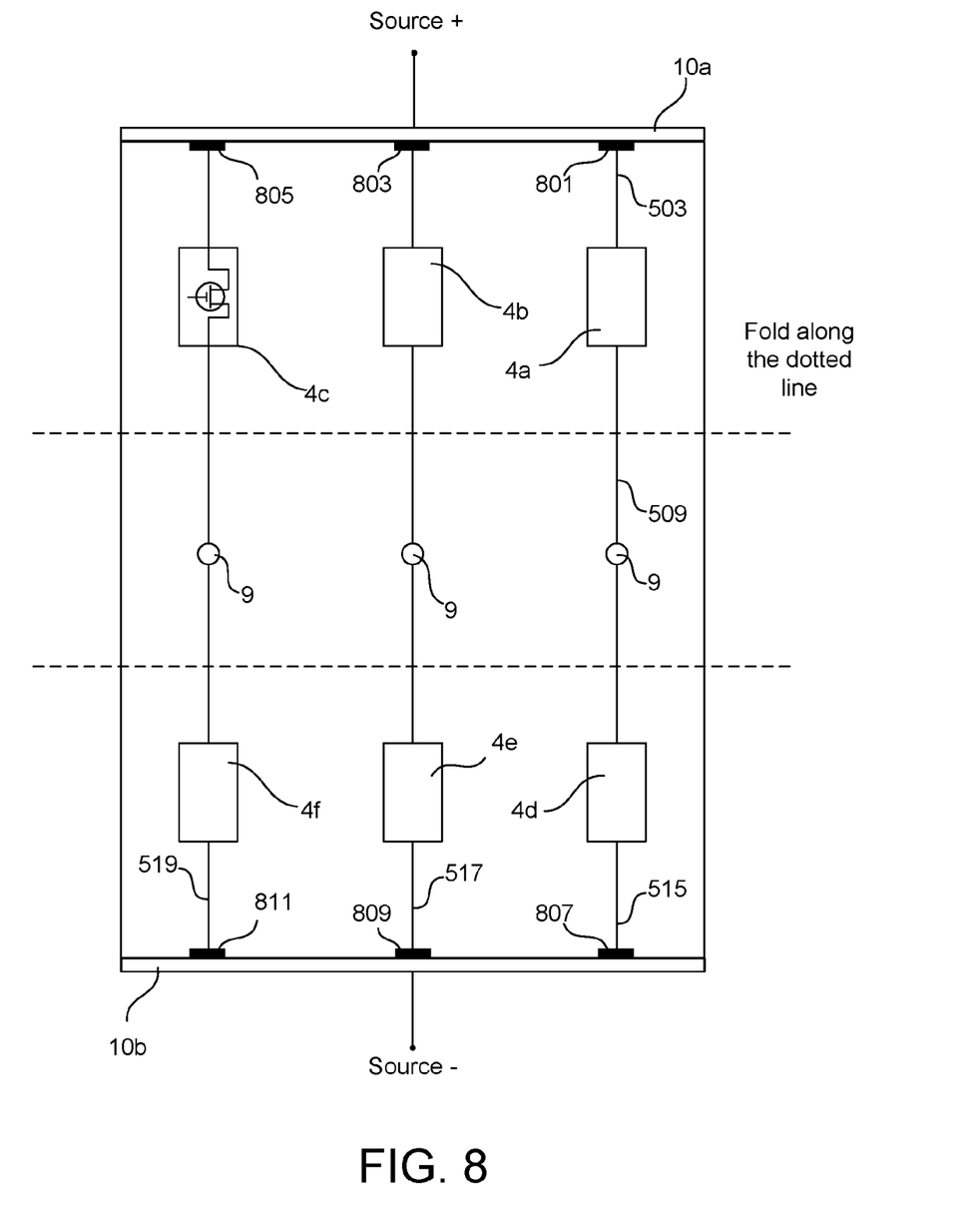
FIG. 8 is an illustration of the inverter laid out flat prior to folding into the final U-shape.

FIGS. 5, 6 and 7 are detailed illustrations of the inverter 3. The inverter 3 is fabricated on a U-shaped substrate 501. Alternatively, the inverter 3 is fabricated on a planar substrate that is folded into a U-shape after fabrication. FIG. 8 is an illustration of the inverter 3 laid out flat prior to folding into the final U-shape. Two dotted lines shown in FIG. 8 indicate where the inverter 3 is folded to form the U-shaped structure in the case in which the inverter is initially fabricated on a planar substrate. Three of the six switches 4 are shown in FIGS. 5, 6 and 7. Another three switches are mounted on the underside of the substrate 501, and so are not visible in FIGS. 5, 6 and 7. All six switches are shown in FIG. 8 and in the schematic of FIG. 3.

A first conductor 503 is connected to a first switch 4a; a second conductor 505 is connected to a second switch 4b; and a third conductor 507 is connected to a third switch 4c. A connection pad 801, 803, 805 at the end of each of the conductors 503, 505, 507 couples each of the conductors 503, 505, 507 to a plus rail conductor 10a. The plus rail conductor 10a connects the three switches 4a, 4b, 4c to a terminal of a power source 5. A conductor 509 connects the other side of the first switch 4a to a male contact 9. Similarly, conductors 511, 513 connect the other two switches 4b, 4c to two other male terminals 9. Similarly, each of the three switches 4d, 4e, 4f on the other side of the inverter 3 (shown in FIG. 8, but not shown in FIGS. 5, 6 and 7) are coupled by one of three conductors 515, 517, 519 to a corresponding one of the three terminals 9. Each male terminal 9 is accepted by a corresponding female terminal 108 to allow each inverter 3 to electrically mate with a corresponding one of the CTSs 6. The three switches 4d, 4e, 4f are each connected to a connection pad 807, 809, 811. The connection pads 807, 809, 811 connect these three switches 4 to a minus-rail conductor 10b. Accordingly, by closing each of the three switches 4a, 4b, 4c, (though not all three at once) a corresponding one of the conductors 2 of the CTS 6 can be connected to the plus rail conductor 10a. Likewise, by closing each of the other three switches 4d, 4e, 4f, a corresponding one of the conductors 2 of the CTS 6 can be connected to the minus rail conductor 10b. It should be noted that for current to flow, at least one switch one each side (top and bottom) of the inverter 3 needs to be closed.

FIGS. 6 and 7 show a power source 5 fitted within the U-shaped structure of the inverter 3. In some embodiments of the disclosed method and apparatus, micro-channels can be provided inside the inverter 3 for improved cooling of the switches 4.

Figure 9:
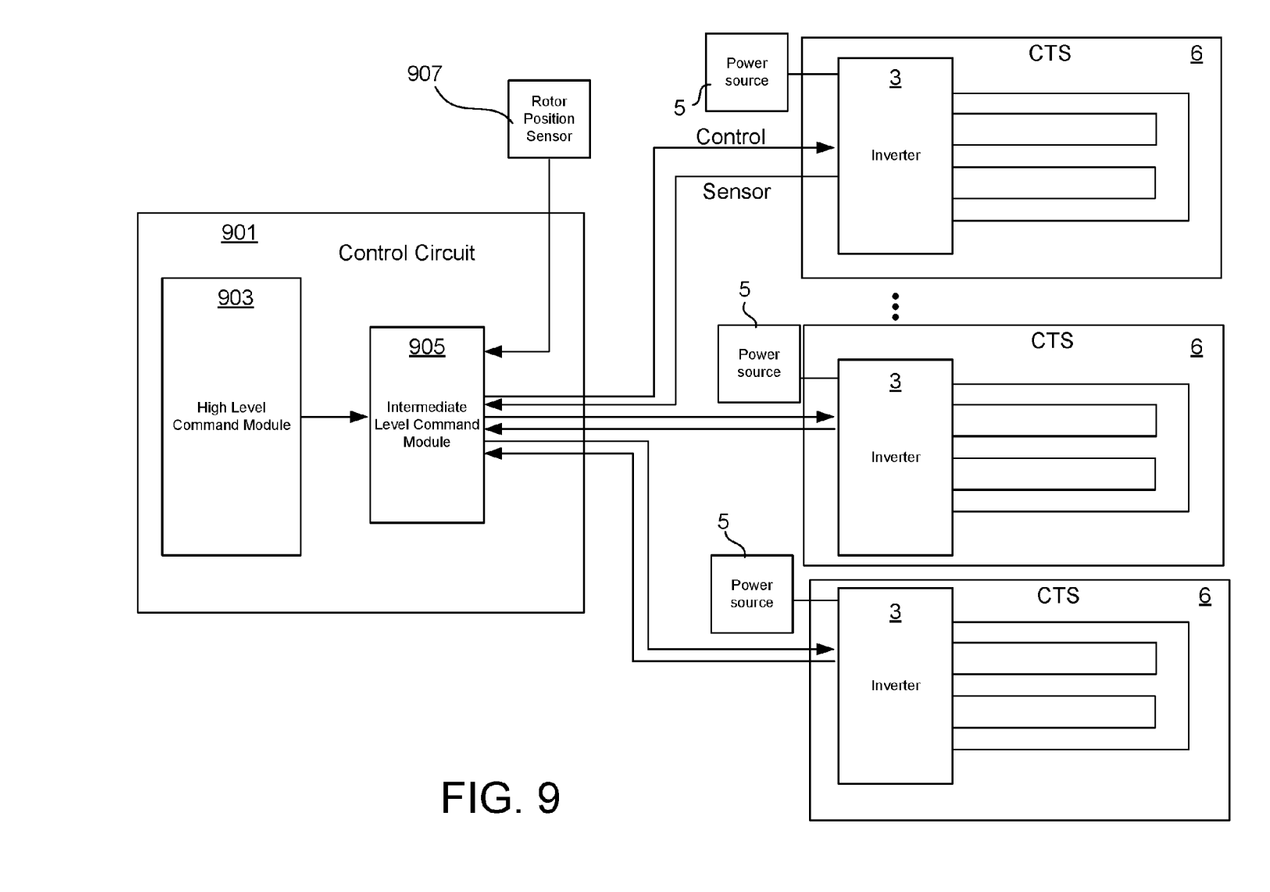
FIG. 9 is a block diagram showing several CTSs coupled to a control circuit.

FIG. 9 is a block diagram showing several CTSs 6 coupled to a control circuit 901. For the sake of simplicity, the control circuit is described in the context of a motor. However, it will be understood that a similar architecture is applicable to the case of a generator as well. In one case, the six switches 4 (see FIG. 3) of each inverter are controlled by the output of the control circuit 901. The switches 4 can be either opened or closed. In some cases, the switches 4 of the inverter 3 are implemented using a metal-oxide semiconductor field effect transistor (MOSFET) or equivalent semiconductor switch. In some cases, low voltage MOSFETs are used that have a current density in the range of thousands of Amps per square-centimeter that take advantage of the short thermal distance associated with low voltage devices. Accordingly, due to the higher power density switching, a relatively large number of inverters can be constructed on a single structure.

In one case, the switches 4 are high current enhancement-mode MOSFETs, operated in pulsed mode and controlled by a control circuit 901. In the case of motors, timing the opening and closing of the MOSFETs 4 allows the current in the conductors 2 of the CTSs 6 to flow in a manner that generates a magnetic field that interacts with the magnetic field of the rotor 11 to cause the rotor to move as desired. Sensors may be used to detect the relative position of the rotor 11 with respect to the stator 8. With the aid of the sensors, waveforms can be generated to cause the rotor 11 to move with respect to the stator 8. For example, sinusoidal signals can be generated within the inverters 3. Timing of inverters to create three-phase sinusoidal waveforms in motor windings to produce rotating magnetic fields is well known in the art. The magnetic fields can be generated by each CTS 6 by controlling the current flowing through the conductors 2 in response to the sensors that detect the relative position of the rotor 11 with respect to the stator 8. Such fields can also be used to generate forces that manage the magnetic flux air gap between the rotor 11 and the stator 8. Since each CTS 6 can be independently controlled, complex magnetic forces can be generated to move the rotor 11 with significant flexibility. Using the inverters 3 together with sensors to manage the magnetic flux air gap can either eliminate the need for physical bearings (such as ball bearings or roller bearings), or can be used to reduce the wear on such physical bearings.

In one case, a high level command module determines the motion to be generated in the motor (i.e., the relative motion that is desired of the rotor 11 with respect to the stator 8). A high level command is provided by the high level command module 903 to an intermediate level command module 905. The intermediate level command module 905 interprets the motion indicated by the high level command. In response, the intermediate level command module 905 generates control signals to the inverters 3 (i.e., to the switches 4) of each CTS 6. Such signals cause currents to flow in the conductors 2 of each CPS 6 to generate the desired magnetic fields required to move the rotor 11 and thus to generate the desired motion. In one case, the intermediate level command module 905 has drivers that provide the appropriate drive to the gates of the MOSFETs used to implement the switches 4 in each inverter 3 within the CTSs 6. Alternatively, the drivers can be provided as an integral part of the CTS 6. In one such case, the drivers are integrated into the inverter 3.

In order to generate the proper current waveform in each CTS 6, the intermediate level command module 905 receives an output from a rotor position sensor 907. The rotor position sensor 907 indicates the relative position of the rotor 11 with respect to the stator 8. The intermediate level command module uses this information together with knowledge of the relative location of each CTS 6 within the stator 8 to determine the proper current waveform to generate in each of the conductors 2 of the TTW 1. In some cases, several sensors may be required to detect the position in a sufficient number of axes to allow the intermediate level command module to determine what current waveforms to generate in order to manage the magnetic flux air gap. The rotor position sensors can be optical sensors, Hall Effect sensors, or any other sensor that can provide the necessary position information to the intermediate level command module 905. In some cases, there are local sensors at each CTS 6 that sense the rotor position. In addition, those sensor or other such sensors might also sense back EMF within each of the TTWs 1 in order to assist in controlling and generating the magnetic fields.

In addition to the rotor position sensor 907, other sensors may provide information to the intermediate level command module 905. For example, in one case, current sensors may be provided to indicate the amount of current flowing in each of the conductors 2. By sensing the current in the conductors 2, the intermediate level command module 905 can determine the load on the motor. Alternatively, the total current delivered to each CTS 6 can be determined. In some cases, the current levels can be provided to the high level command module 903 rather than to each intermediate level command module 905. Other means for detecting the load on the motor can be used as well to provide information to the intermediate level command module 905. In response, the intermediate level command module 905 can reduce the number of active CTSs 6. Reducing the number of active CTSs 6 can save resources. In addition, the intermediate level command module 905 can use such information to detect failures in one of the CTSs 6. In response, the intermediate level command module 905 can deactivate a CTS 6 that has failed. In some embodiments, when a CTS 6 is deactivated, no current flows through the conductors 2 of a deactivated CTS 6. Current sensors may be implemented within each inverter 3.

Figure 10:
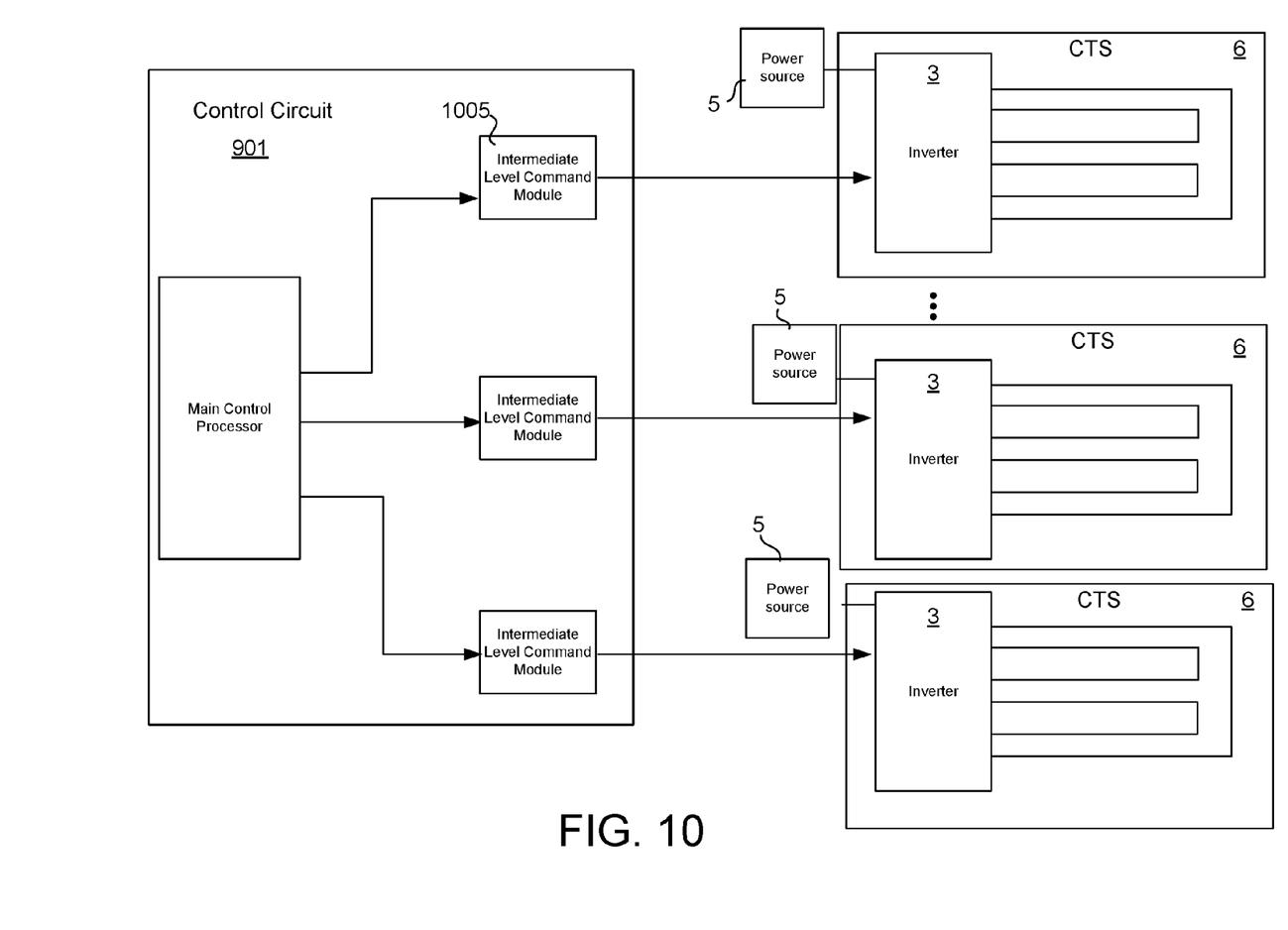
FIG. 10 is an illustration of an embodiment of the disclosed method and apparatus in which there is one intermediate level command module associated with each CTS.

FIG. 10 is an illustration of an embodiment of the disclosed method and apparatus in which there is one intermediate level command module 1005 associated with each CTS 6. In some cases, the intermediate level command module 1005 can be fabricated together with the inverter 3.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A motor/generator comprising:
   a) a stator composed of a base material having a plurality of controllable turnless structures (CTS) disposed thereon, each CTS comprising:
      i. a turnless three-phase winding (TTW) having three conductors, each conductor having a proximal end and a distal end, the three conductors coupled at their proximal ends;
      ii. an inverter having a plurality of control inputs and having three outputs, each output coupled to the distal end of a corresponding one of the three conductors;
   b) a control circuit coupled to the control inputs of each inverter to control multi-phase currents in the TTW;
   c) a position sensor having an output coupled to the control circuit; and
   d) a rotor having a magnetic field and placed in close proximity to the stator such that changes in the multi-phase currents in the TTW cause a field created by the multi-phase currents that flow in the TTW to interact with the magnetic field of the rotor causing the rotor to move with respect to the stator in response to magnetic fields produced by the multi-phase currents in the TTW.

2. The motor/generator of claim 1, wherein the control circuit receives high level commands to perform a task, and in response to the received commands, the control circuit provides signals to the control inputs of each inverter which, in turn, control the multi-phase currents in each TTW in a manner that causes the motor/generator to accomplish the task.

3. The motor/generator of claim 2, the control circuit further comprising:
   a) a high level command module that receives high level commands and outputs intermediate level commands; and
   b) an intermediate level command module that receives intermediate level commands and outputs control signals to the control inputs of each inverter to control the multi-phase currents in the TTW to accomplish the task.

4. The motor/generator of claim 3, wherein the control circuit has one high level command module coupled to a plurality of intermediate level command modules, each of the intermediate command modules associated with at least one of the inverters and each of the inverters coupled to at least one of the intermediate command modules.

5. The motor/generator of claim 1, further comprising a plurality of power sources, each power source coupled to at least one CTS.

6. The motor/generator of claim 1, wherein the control circuit controls the multi-phase currents in a plurality of the TTWs to control a magnetic bearing in a magnetic flux air gap between the stator and rotor.

7. The motor/generator of claim 1, further comprising at least one operational sensor associated with a corresponding one of the CTSs, each operational sensor coupled to the inverter of the corresponding CTS to determine the operation of the TTW within the CTS.

8. The motor/generator of claim 7, wherein the operational sensor is further coupled to the control circuit, the operational sensor providing the control circuit with operational information from which the control circuit can determine whether the CTS is operational.

9. The motor/generator of claim 8, wherein the control circuit controls the multi-phase current that flows in each TTW based on the information provided by the at least one operational sensor.

10. The motor/generator of claim 9, wherein the control circuit deactivates CTSs that the associated sensor indicates are not operational.

11. The motor/generator of claim 1, further comprising a sensor for detecting the magnitude of the load, the sensor coupled to the control circuit and wherein the control circuit reduces the number of active TTWs for cases in which the magnitude of the load is relatively small.

12. The motor/generator of claim 1, wherein the stator is planar and is disposed on a first plane and the rotor is planar and is disposed on a second plane coplanar to the first plane.

13. The motor/generator of claim 1, wherein the control circuit activates a subset of the CTSs.

14. The motor/generator of claim 1, wherein the motor/generator is a motor further comprising a power source.

15. The motor/generator of claim 1, wherein the motor/generator is a generator further comprising a load.

16. The motor/generator of claim 1, further including a plurality of DC power sources, each associated with an inverter.

* * * * *